(12) United States Patent
Apel

(10) Patent No.: US 6,491,019 B1
(45) Date of Patent: Dec. 10, 2002

(54) ANGULAR ROTATION SENSOR

(75) Inventor: Peter Apel, Südkirchen (DE)

(73) Assignee: AB Elektronik GmbH, Werne (DE)

( * ) Notice: Subject to any disclaimer, the term of this patent is extended or adjusted under 35 U.S.C. 154(b) by 0 days.

(21) Appl. No.: 09/491,807

(22) Filed: Jan. 28, 2000

(30) Foreign Application Priority Data

Jan. 29, 1999 (DE) .......................................... 199 03 490
Jan. 29, 1999 (DE) .......................................... 299 01 516

(51) Int. Cl.⁷ .................................................. F02D 9/08
(52) U.S. Cl. ...................................... 123/337; 123/361
(58) Field of Search .............................. 123/337, 361, 123/399; 251/305

(56) References Cited

U.S. PATENT DOCUMENTS 6,109,240 A * 8/2000 Sato et al. ................. 123/366
6,155,533 A * 12/2000 Semeyn et al. ............. 123/396
6,279,535 B1 * 8/2001 Matsusaka .................. 123/399
6,295,968 B2 * 10/2001 Torii et al. .................. 123/337

FOREIGN PATENT DOCUMENTS

| DE | 19630764 | 4/1997 |
| DE | 19634281 | 2/1998 |
| DE | 69502512 | 1/1999 |
| WO | WO 98/55828 | 12/1998 |

* cited by examiner

*Primary Examiner*—John Kwon
(74) *Attorney, Agent, or Firm*—Milde & Hofberg, LLP

(57) ABSTRACT

The present invention discloses a position device that includes an angular rotation sensor for use in connection with a throttle valve assembly. The rotation sensor consists of a stationary and rotating unit provided in an enclosed cap element. The present invention also includes an adjusting device having an angular rotation sensor and a throttle unit.

18 Claims, 10 Drawing Sheets

ANGULAR ROTATION SENSOR

FIELD OF INVENTION

This application claims priority to German application Nos. 199 03 490.7 (now German Patent DE 199 03 490) and 299 01 516.5, both of which were filed on Jan. 29, 1999.

The invention relates to a position device for a throttle valve that contains at least an angular rotation sensor unit and a control unit that is arranged on the throttle valve element, and more particularly the invention relates to a device wherein the throttle valve with a throttle valve shaft element is arranged in a housing element, so that it can be adjusted.

BACKGROUND OF THE INVENTION

A position device of the aforementioned type is known from WO 95 14 911 A1. In that reference, which discloses an enclosed throttle valve housing, a throttle valve with a throttle valve shaft is arranged so that it may rotate. An angular rotation sensor, which consists of a stationary and a rotating unit, is connected to the throttle valve shaft. In a stator element of the stationary unit, a Hall-effect element is arranged. The rotating unit features a ring magnet that can be moved around the stator element. This angular rotation sensor is, however, arranged in a cup-shaped housing and placed on the throttle valve housing from the outside.

In the event that a motor unit and a transmission unit are used as a drive unit, they are placed in the actuator housing together with the angular rotation sensor and a circuit unit. The actuator housing is then placed on the throttle housing. In both cases it is visible from the outside that the throttle valve housing has been fitted with accessories. In addition, dirt, etc., can build up, particularly between the throttle valve housing and the actuator housing.

DE 197 13 838 A1 discloses a throttle valve potentiometer. In that reference, a positioning motor that acts upon a throttle valve shaft via a reducing gear transmission is installed in or attached to a throttle valve housing. A carrier plate is glued into the throttle valve housing. The carrier plate carries contact rails and/or sliding contacts, wherein a collector, which is positioned on the throttle valve shaft, slides over the rails. The carrier plate, the contact rails and/or sliding contacts as well as the collector form the throttle valve potentiometer.

It is a disadvantage that the throttle valve potentiometer can only be constructed and assembled in one place together with the throttle unit. In addition, the insertion of the potentiometer is time intensive and complex.

Additionally, adjusting devices are known, for example, from 95 14 911 A1, which discloses a throttle valve contained in a throttle valve housing. The throttle valve is retained rotatably in the throttle valve housing by a throttle valve shaft. An angular rotation sensor, a transmission unit, and a motor unit that are connected to each other are contained in a sensor housing. A specially configured electronics housing separately contains a circuit unit. The individual housing elements can be plugged together. The angular rotation sensor consists of a stationary component in relation to which a rotatable component can be moved. The stationary element is a stator element consisting of two half-moon-shaped partial stator elements between which a distancing gap is located that retains a Hall probe. The rotating element is a ring magnet element that is retained by a magnet unit connected by a shaft.

Although this adjusting device is a proven design, the assembly effort is still too high. In addition, the angular rotation sensor, the motor, and the transmission cannot be attached to any throttle unit.

SUMMARY OF THE INVENTION

The present invention is directed to a position device for a throttle of the aforementioned type in such a way that the assembly with the throttle valve housing and the throttle valve shaft is easier and more cost effective to manufacture.

The advantages accomplished by the invention consist mainly in that the active elements of the angular rotation sensor are contained in a cap element. In addition, depending on the requirements, a motor may also be installed in the cap element as a control unit. The control unit and the rotor element of the angular rotation sensor are connected via a transmission. In an exemplary embodiment, the chosen gear ratio is 1:200. This ratio makes sure that even the smallest movements of the throttle valve are registered precisely. Due to the slip-free transmission, the precision of the registered values is extremely high. It is a particular advantage of the present invention that the cap element and the parts contained in it can be manufactured separately in large quantities. This reduces manufacturing costs significantly. The cap element itself may be adapted to the individual throttle valve housings. If necessary, an adapter may be used. Since it is rather easy to put the cap element on the throttle valve housing element, assembly costs are also reduced. Once the throttle valve housing element has been closed with the cap element, a unit is formed that, when viewed from the outside, is visibly finished.

In a broad aspect, the present invention also comprises an adjusting device including: a throttle unit comprising a throttle valve that is positioned adjustably with a throttle shaft in a throttle housing element; and an angular rotation sensor unit that can be connected with the throttle unit and that comprises a stationary unit, a mobile unit that is mobile in relation to the stationary unit, a motor element, a transmission element that is positioned between the mobile unit and the motor element, and a sensor housing unit that at least partially encloses at least the stationary unit, the mobile unit, the motor element, and the transmission unit.

Accordingly, it is an object of the present invention to provide an adjusting device which is easy to assemble and to attach to a throttle unit.

The advantages resulting from the invention consist mainly in that the mobile unit can be moved into a defined end position by a spring element. This end position assists both in assembly and in positioning. Installing the mobile unit in a sprocket wheel that is part of the transmission unit saves space and simplifies assembly. Assembly is further simplified by positioning certain components inside the sensor cap element and inside the sensor housing element. By putting the sensor cap element on the sensor housing element simultaneously, the mobile unit is fixed and assembled on the stationary unit. In addition, the angular rotation sensor unit with the transmission may be plugged onto any throttle unit in a simple manner.

The stationary unit and the mobile unit may be part of a potentiometer angular rotation sensor or of an angular rotation sensor unit that functions based on a magneto-electrical principle: which of the principles is applied depends on the deployment conditions and on the requirements of the customer.

In the angular rotation sensor unit, the stationary unit may be a stator element with at least one Hall probe and one correlated circuit board. The mobile unit may be a rotor element with at least one ring magnet element that is retained by a ring magnet retaining element and that may be moved in relation to the stator element. This makes it possible to measure the rotation angle with utmost precision.

The stator element comprises at least two partial stator elements between which a distancing gap exists, so that the elements may be inserted into a stator-retaining recess of the sensor cap element. This permits assembly of the stator element in the proper position.

Two Hall probes may be positioned on the circuit board. There are two Hall probes for reasons of redundancy. This significantly increases the reliability of the angular rotation sensor unit. The circuit board may be attached inside the sensor cap element in such a manner that the two Hall probes are located in the distancing gap. This measure reduces to a minimum the adjusting effort for the precise fixing of the two Hall probes in the distancing gap.

The transmission unit may comprise: a rotor sprocket wheel into which the ring magnet retaining element with the ring magnet element of the rotor element is embedded as a rotating unit, and to which a sensor shaft element may be connected; an adjustable sprocket wheel into which the rotor sprocket wheel engages, and with which an intermediate sprocket wheel interfaces; and a motor sprocket wheel that may be connected to a shaft of the motor element.

Through the gear ratio of the individual rotations of the motor element and, above all, of the rotating unit, minute changes caused by these parts are effectively registered and precisely transferred.

The sensor shaft element may be at least partially slotted. The provisioned slot in the sensor shaft element guarantees that the entire angular rotation sensor unit is correctly plugged onto differing throttle units. In this way, special adjustments or complicated assembly are avoided.

The rotor sprocket wheel may contain a stop recess into which a stop element can be positioned. In this manner, it is guaranteed that the rotor element is always rotated back by the spring element into a defined position. The spring element may be a torsion spring.

A peripheral cap gasket element may be located between the sensor cap element and the sensor housing element. The cap gasket element may be made from a flexible gasket material such as rubber, soft plastic material, or a similar material. The gasket ensures that the interior of the thus created sensor housing unit is effectively protected from dust, humidity, and the like.

BRIEF DESCRIPTION OF THE DRAWINGS

Embodiment examples of the invention are shown in the drawing in a simplified manner and more closely explained in the description below. The figures show.

DETAILED DESCRIPTION OF EXEMPLARY EMBODIMENTS

Figure 1:
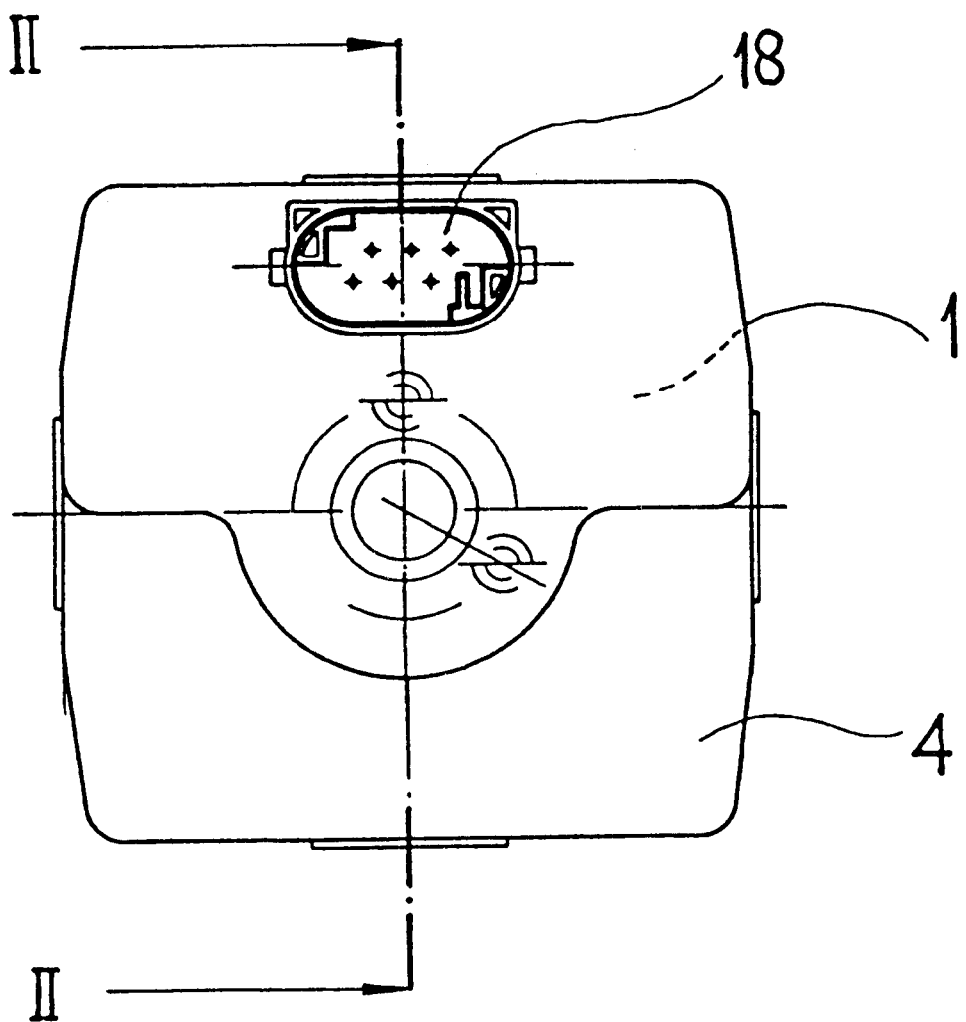
FIG. 1 is a first embodiment of an angular rotation sensor according to the present invention in a frontal view.

In the angular rotation sensors shown in FIGS. 1 through 6, an angular rotation sensor unit 1, 101, 201 is positioned in a cap element 4, 104, 204. It is to be understood that three serial reference numerals used in this specification refer to like elements of the embodiments shown in FIGS. 1–2, 3–4, and 5–6, respectively.

The angular rotation sensor unit 1, 101, 201 consists of a stator element 13, 113, 213 that is fixed in the cap element 4, 104, 204. The stator element consists of two opposing partial stator elements that are shaped like apple slices or like ring segments, between which there is at least one distancing gap. Into this distancing gap two opposing Hall-effect IC elements 11, 11'; 111, and 111'; 211, 211' protrude. The Hall-effect IC elements used in the present invention are commercially available from vendors such as Siemens and Analog Devices. The redundant arrangement of Hall-effect IC elements is for safety reasons. In the event that one of the Hall-effect IC elements malfunctions, the other takes over the measuring function. However, the two Hall-effect IC elements may also constitute a 360° angular rotation sensor if the stator element consists of three or four ring segment elements and if the Hall-effect IC elements are positioned in two adjacent distancing gaps.

The Hall-effect IC elements 11, 11'; 111 and 111'; 211, 211' are connected to an evaluator unit that is positioned on a printed circuit board 12, 112, 212. The Hall-effect IC elements are also attached to this circuit board. The circuit board 12, 112, 212 is connected to the cap element 4, 104, 204. In the circuit board 12, 112, 212 there are connecting sockets for a flat-wire plug 18, 118, 218, which is formed in the cap element 4, 104, 204.

Reference numbers 15, 115, 215 designate a rotor element that retains a ring magnet element 14, 114, 214 that is positioned rotatably in an air gap opposite from the two partial stator elements of the stator element 13, 113, 213. The rotation of the rotor element 15, 115, 215 is guaranteed by the rotor axle 17, 117, 217 that is retained in the cap element 4, 104, 204.

The rotor element fans out in a circular shape and features coupling pin recesses into which coupling pins 16, 116, 216 of a toothed gear element 21, 121, 221 extend. A clutch element 22, 122, 222 is formed on the toothed gear element 21, 121, 221.

The cap element 4 features a cap body 41 that is open on one side and that ends in a cap locking ring 42 on the open side. The cap locking ring features a circumferential clamping groove.

Figure 2:
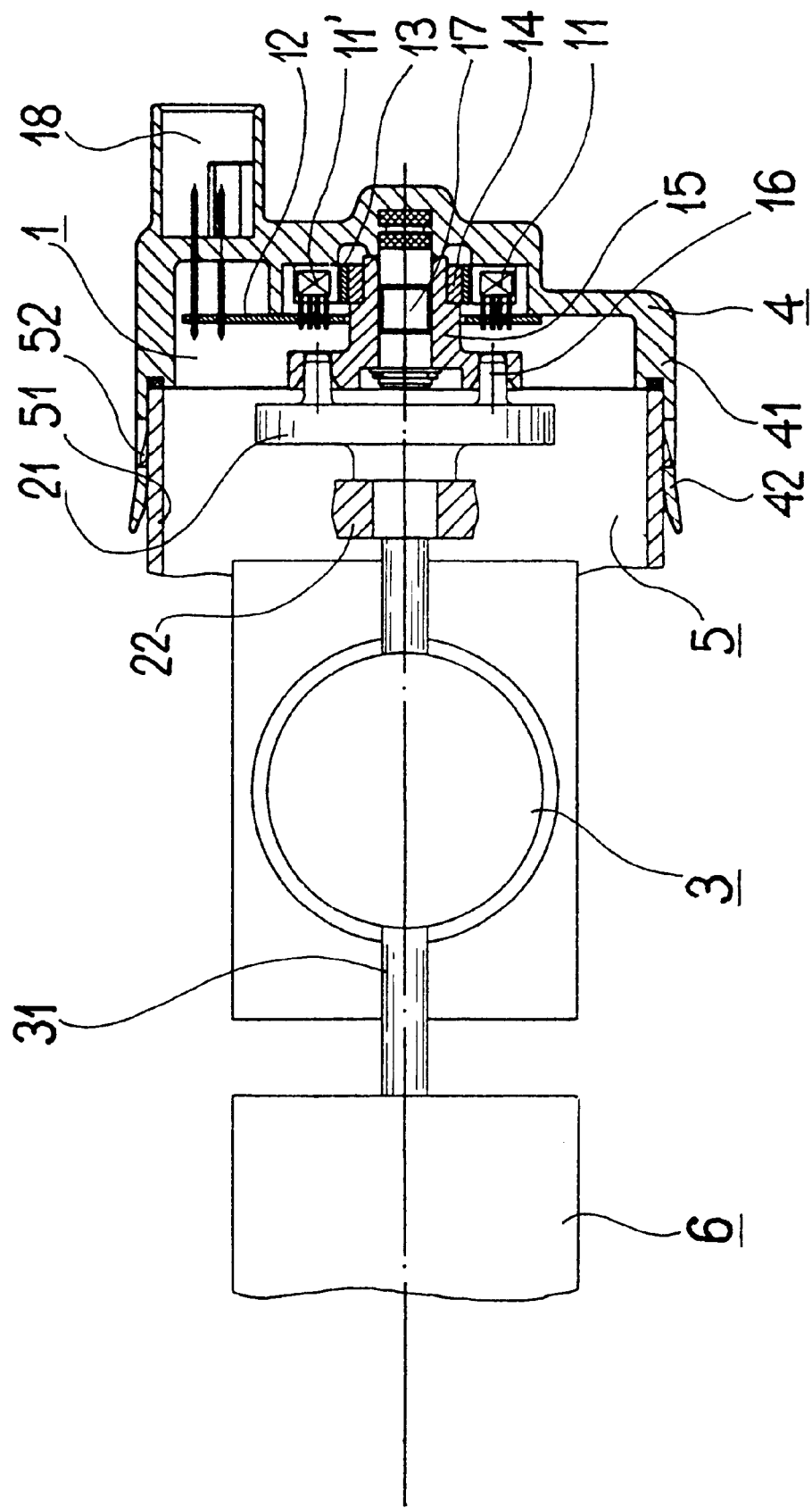
FIG. 2 is a cross-sectional view of an angular rotation sensor according to FIG. 1 along the line II—II.

As can be seen in FIG. 2, an angular rotation sensor unit 1 is contained in the cap element 4. Also shown is a throttle valve 3 that is arranged rotatably with a throttle valve shaft element 31 in a housing body 51. The housing body 51 features a circumferential snap-lock ring element 52.

It is important to the present invention that the angular rotation sensor unit 1 be pre-assembled completely into a throttle valve housing element 5. This permits pre-assembly in a special production line with high output numbers, making production very cost-effective. When closing the housing body 51 with the cap element 4, the ring element snaps into the locking groove of the circumferential cap locking ring 2. In addition, the clutch element 22 engages one end of the throttle valve shaft element 31. To the opposite end of the throttle valve shaft element 31, a control unit is attached. This control unit could be a motor 6, a gear or a Bowden pull wire.

Figure 3:
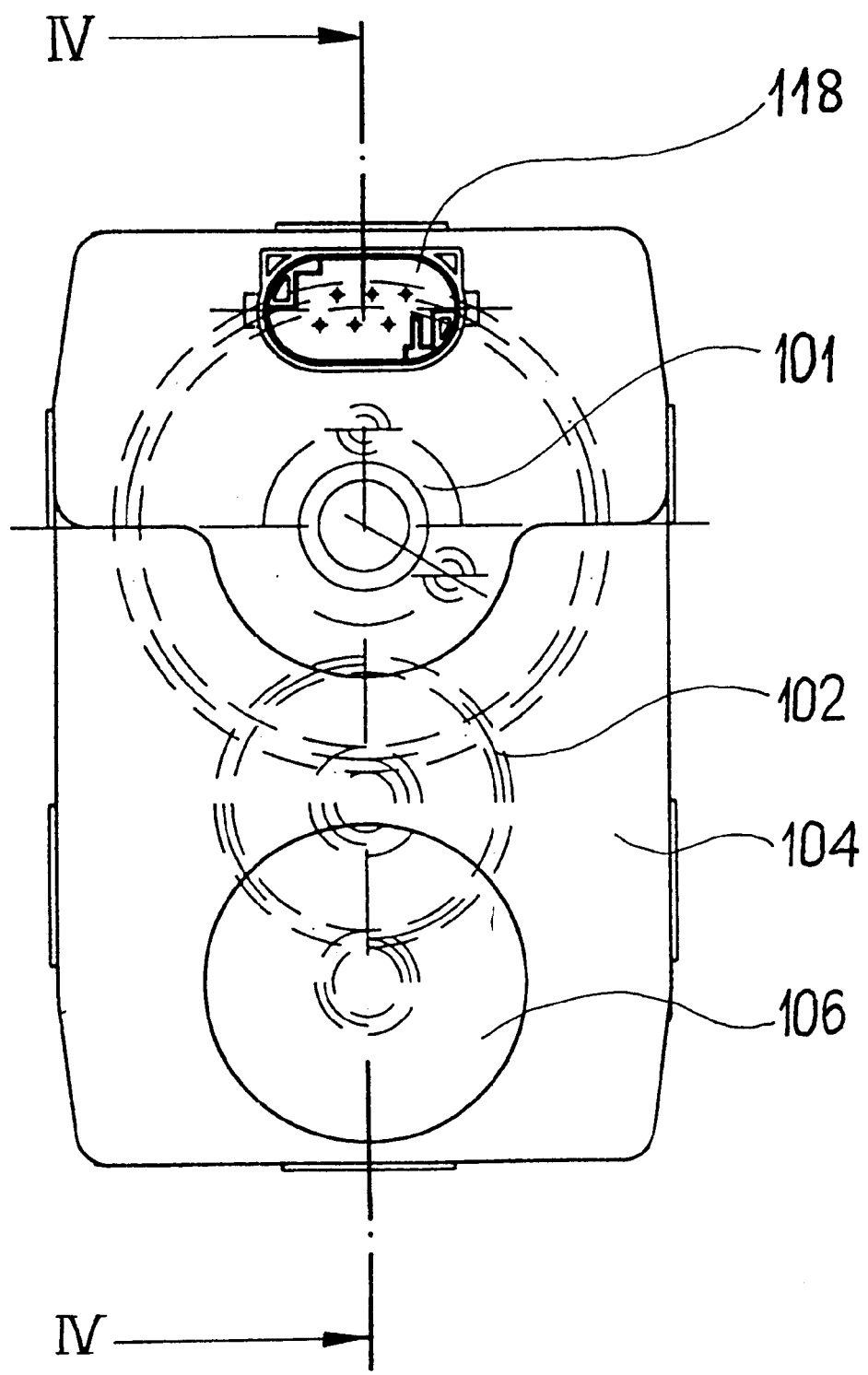
FIG. 3 is a second embodiment of an angular rotation sensor according to the present invention in frontal view.
Figure 4:
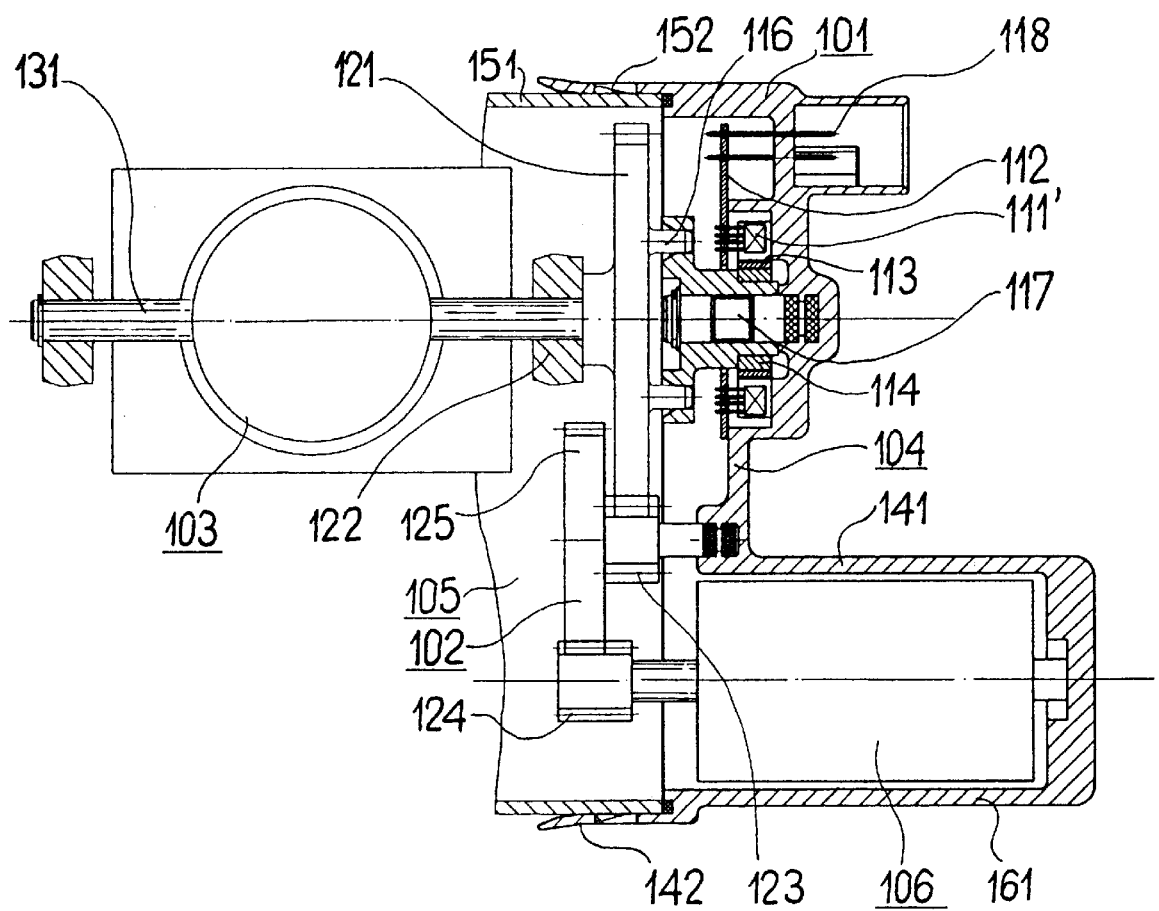
FIG. 4 is a cross-sectional view of an angular rotation sensor according to FIG. 3 along the line IV—IV.

In the angular rotation sensor shown in FIGS. 3 and 4, aside from the angular rotation sensor unit 101, a motor 106 is also arranged in the cap element 104 as a control unit. The rotation axle of the motor is parallel to the rotor axle 117 of the rotor element 115 of the angular rotation sensor unit 101.

The motor 106 and the rotor element 115 are connected via a transmission. A planetary gear train 102 is used. Part of the transmission is the toothed gear element 121 that is connected to the rotor element 115. In addition, the transmission 102 features a motor bevel gear 124 that is connected to the motor axle of the motor 106. Part of the transmission is also an intermediate bevel gear 125, below which an adjustable bevel gear 123 is located. The adjustable bevel gear 123 features an axle stub on which both bevel gears 123, 124 are mounted so they can rotate. In this arrangement, the toothed gear element 121 engages the adjusting bevel gear 123, and the intermediate bevel gear 125 engages the motor bevel gear 124.

When slipping the cap element 104 onto the throttle valve housing element 105 simultaneously, here too, the clutch element 122 engages a throttle valve shaft element 131 to which a throttle valve 103 is attached. Just like throttle valve housing element 5, the housing element 105 also features a housing body 151 that is connected to a snap-lock ring element 152. A circumferential gasket element ensures that the placed cap element seals the housing element tightly against all external influences.

Figure 5:
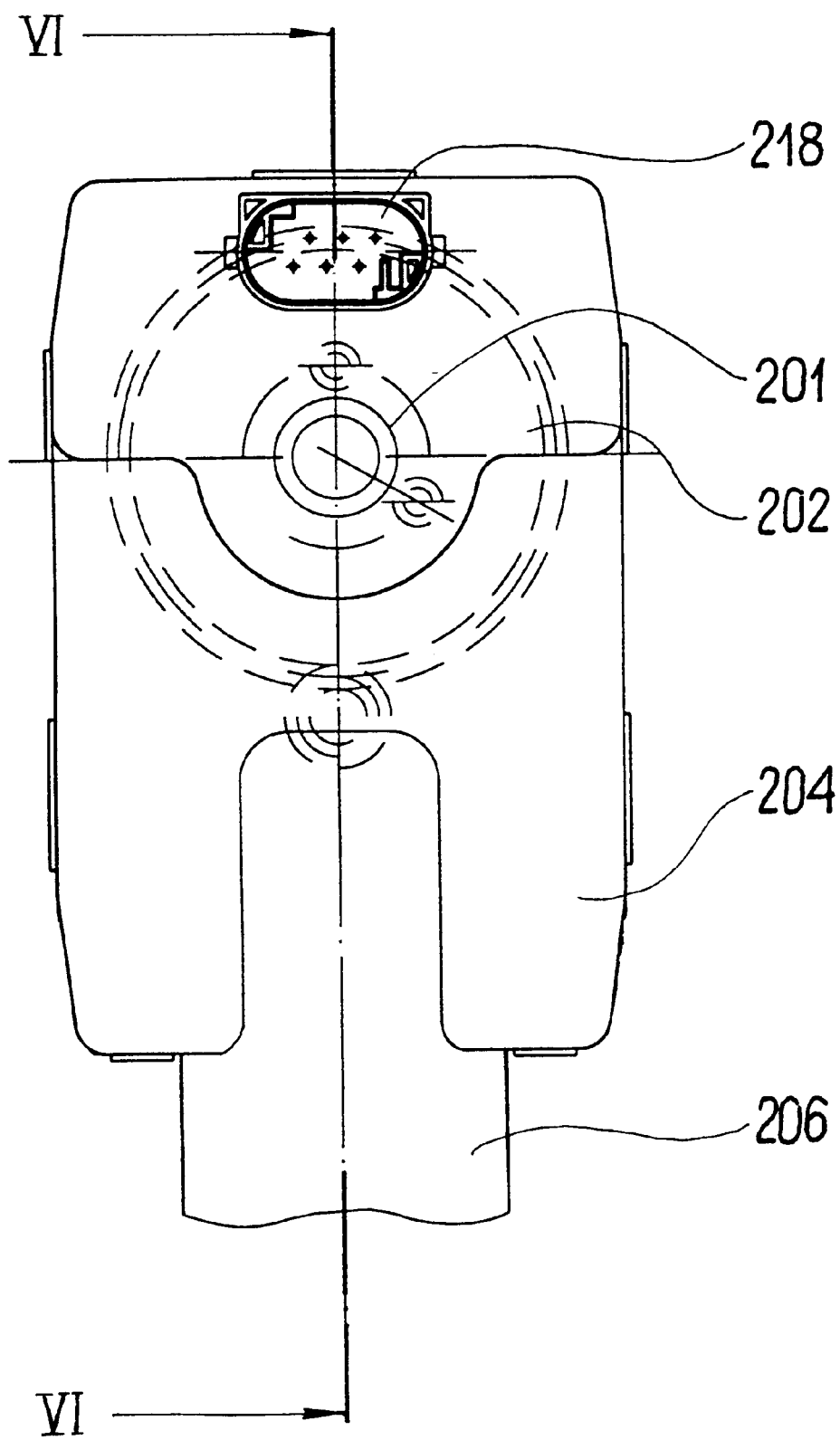
FIG. 5 is a third embodiment of an angular rotation sensor according to the present invention in a frontal view.
Figure 6:
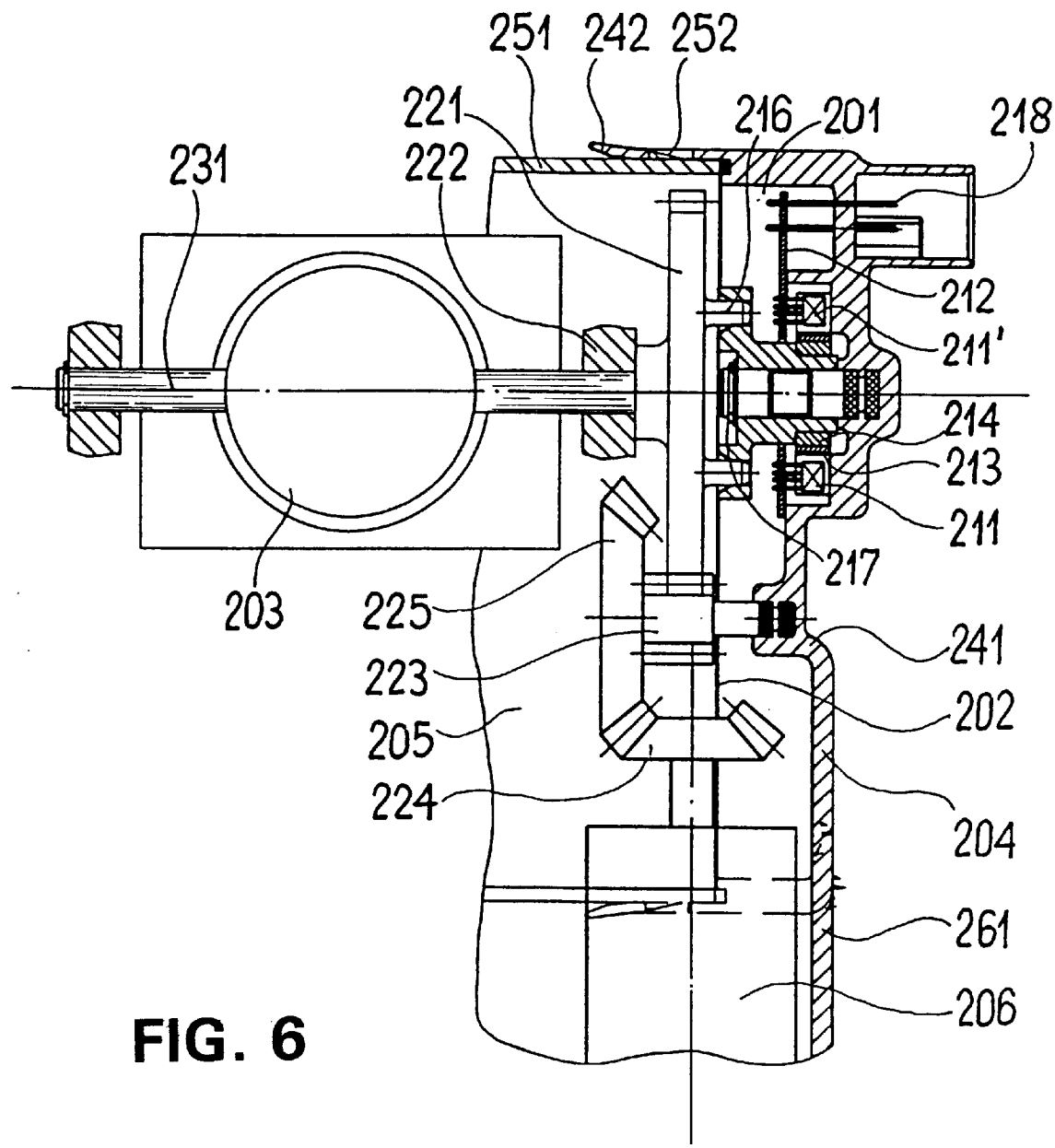
FIG. 6 is a cross-sectional view of an angular rotation sensor according to FIG. 5 along the line V—V.

In the angular rotation sensor shown in FIGS. 5 and 6, aside from the angular rotation sensor unit 201, a motor 206 is also installed as a control unit. The rotational axle of the motor 206 is offset by 90° in relation to the rotor axle 217.

Here, too, the angular rotation sensor unit 201 is connected to the motor 206 via a transmission. Part of the transmission 202 is the toothed gear element 221, a motor bevel gear 224 that is positioned on the axle of the motor 206, an adjusting bevel gear 223 and an intermediate bevel gear 225. The small adjusting bevel gear 223 is positioned below the larger intermediate bevel gear 225 and rotatably retained in the cap element 204.

When placing the cap element 204 on the throttle valve housing element 205, within which a throttle valve 203 on a throttle valve shaft element 231 is arranged rotatably, a snap-lock ring element 251 of a housing body of the throttle valve housing element 205 snaps into the circumferential cap locking ring 242 of the cap element 204. Between them there is a circumferential gasket that provides a seal between the two elements. It is important to the present invention that when closing the throttle valve housing element 205, the rotor element actively engages the throttle valve shaft element 231 simultaneously via the clutch element 222.

In all three embodiments of the angular rotation sensor of the present invention, one handling operation will easily close the throttle valve housing element 5, 105, 205, which is used as throttle valve housing, with a suitable cap element 4, 104, 204. In this closing process the angular rotation sensor unit 1, 101, 201 is connected to the throttle valve shaft element and in the same connecting process the motor 106 or 206 is also connected. The transmission or planetary gear that features a transmission ratio of 1:200 transmits the smallest movement of the throttle valve 103, 203 with extreme precision. The transmission 102 or the planetary transmission 202 operate slip-free, eliminating the possibility of measuring errors caused by the gear ratio.

The production of the cap element 4, 104, 204 from moldable plastic or metal facilitates easy adaptation to differing throttle valve housing elements 5, 105, 205. If standard housings can be manufactured that can be closed with caps 4, 104, 204 of a standard configuration, the production costs of the angular rotation sensor can be further reduced due to large production volume.

Figure 7:
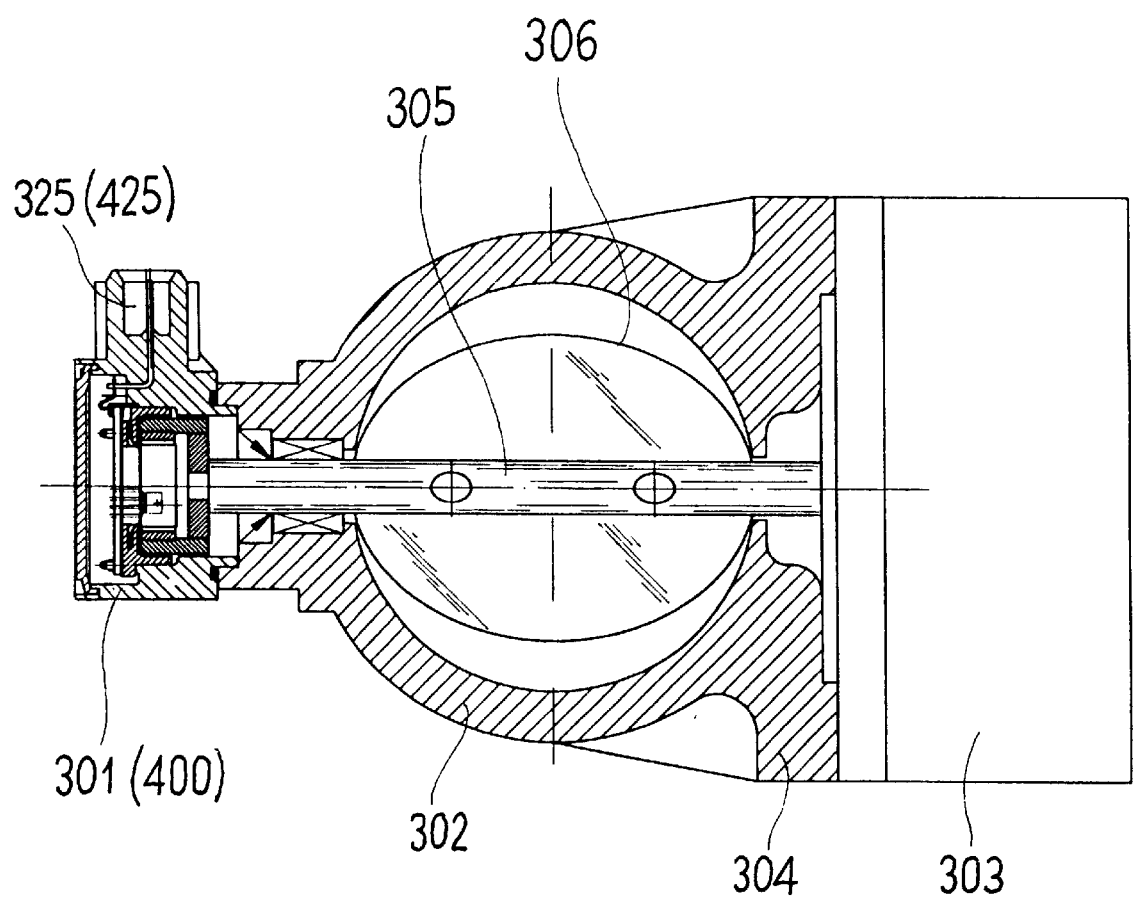
FIG. 7 is an adjusting device consisting of a throttle unit and an angular rotation sensor unit that is connected with it in a schematic cross-sectional view.

In FIG. 7, an adjusting device is shown comprising an angular rotation sensor unit 301, 400 and a throttle unit 302 according to the present invention. The throttle unit 302 features an actuator 303 to which a throttle unit housing element 304 is connected. Within the throttle unit housing element 304, a throttle shaft 305 is rotatably retained to which an adjustable throttle valve is attached.

The angular rotation sensor unit 301, 400 comprises (see FIG. 7 through FIG. 16) a motor element 329, 429; a transmission element 341, 342, 343, 344; a stator element 319, 419 and a rotor element 317, 417 that is in mobile relation to the stator element 319, 419.

The stator element 319, 419 is located inside a sensor cap element 326, 426. The stator element 319, 419 comprises a stator and stator-retaining component. The stator comprises two partial stator elements between which a distancing gap exists (not shown). Two Hall probes 320, 321, respectively 420, 421, that are attached to a circuit board 322, 422 protrude into the distancing gap. A connection exists from the circuit board to a flat-cable plug 325, 425.

Figure 13:
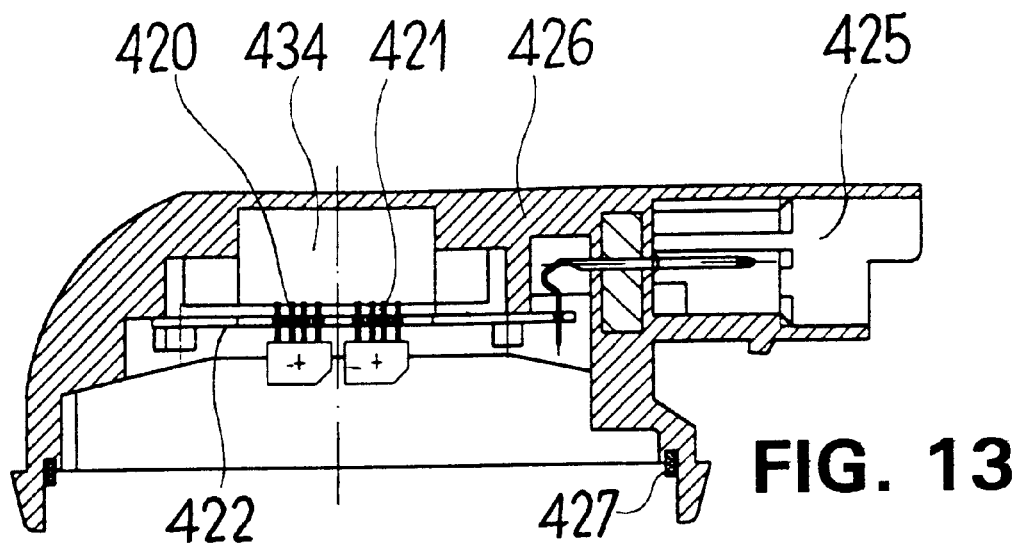
FIG. 13 is a sensor cap element of an angular rotation sensor unit in a schematic cross-sectional view according to FIG. 11.
Figure 14:
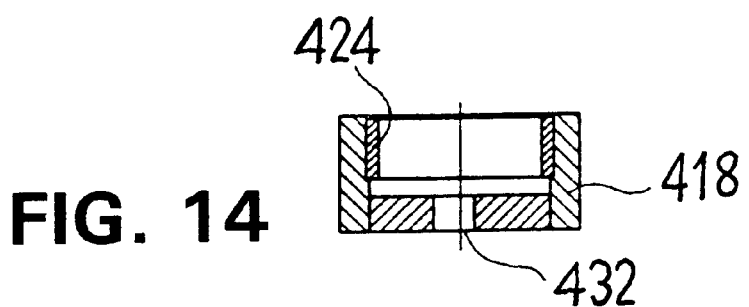
FIG. 14 is a ring magnet unit of an angular rotation sensor unit in a schematic cross-sectional view according to FIG. 11.
Figure 15:
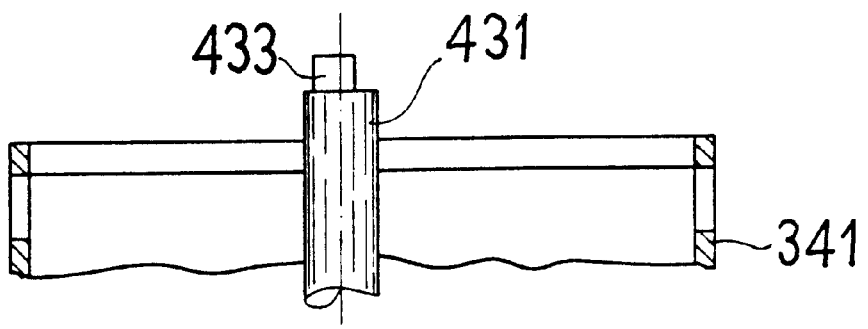
FIG. 15 is a part of a transmission unit of an angular rotation sensor unit in a schematic partial cross-sectional view according to FIG. 11.

As FIG. 13 shows in particular, the circuit board 422 is mounted with bolts in front of a stator recess 334. In this stator recess 334, first the stator element is inserted with the two partial stator elements. The circuit board that is mounted in front of the stator recess steadies and holds the stator element 329 in a firm position with the two Hall probes 320, 421 protruding into the distancing gap.

Both Hall probes 320, 321, or 420, 421, register measured values. If one of the Hall probes malfunctions the other one continues to work, in which manner the reliability of the angular rotation sensor unit 301, 100 is very significantly increased. As can be seen in particular in FIG. 13, a cap gasket elements 327, 427 is inserted into the sensor cap element 326, 426. The gasket element is an elastic gasket made out of rubber or elastic plastic material.

In addition to the motor element 329, 429, the rotor element 317, 417 is located inside the sensor housing element 330, 430. The rotor element comprises a ring magnet element 324, 424 that is retained by a ring magnet retaining element 318, 418. The ring magnet element 424 and the ring magnet retaining element 418 are shown in detail in FIG. 13. A recess 432 for the retention of the shaft is located inside the ring magnet retaining element 418 into which the shaft connecting pin 433 of a sensor shaft element 431 may be inserted.

It is important to the invention that the rotor element 317, 417, constructed in this manner, be located inside rotor sprocket wheel 341 of the transmission unit that is also located inside the sensor housing element. Part of the transmission unit is also an adjustable sprocket wheel 342 that interfaces with the rotor sprocket wheel 341. An intermediate sprocket wheel 343 that interfaces with a motor sprocket wheel 344 mounted on a motor shaft of the motor element 329, 429 is connected with the adjustable sprocket wheel 342. The adjustable sprocket wheel 342 and the intermediate sprocket wheel 343 are both held in place by bolts 323, 423.

Figure 8:
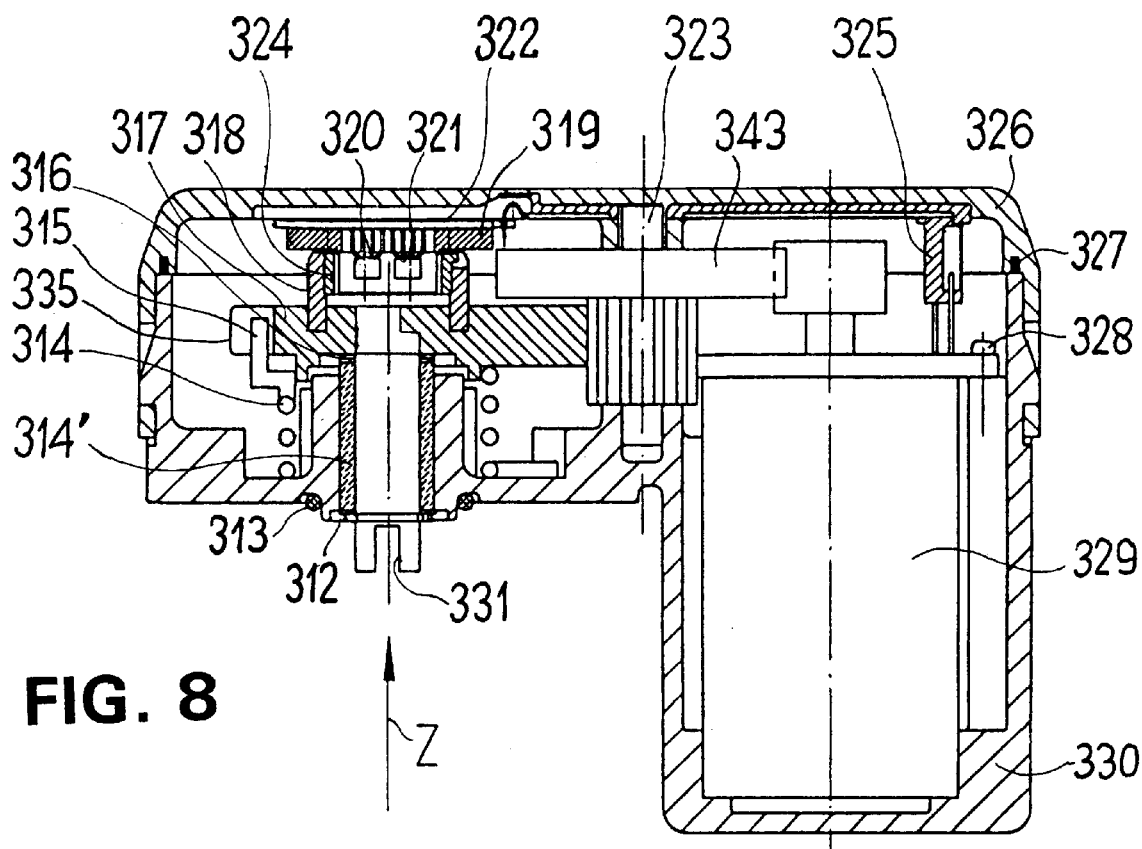
FIG. 8 is an angular rotation sensor unit according to FIG. 1 in schematic cross-sectional view.
Figure 11:
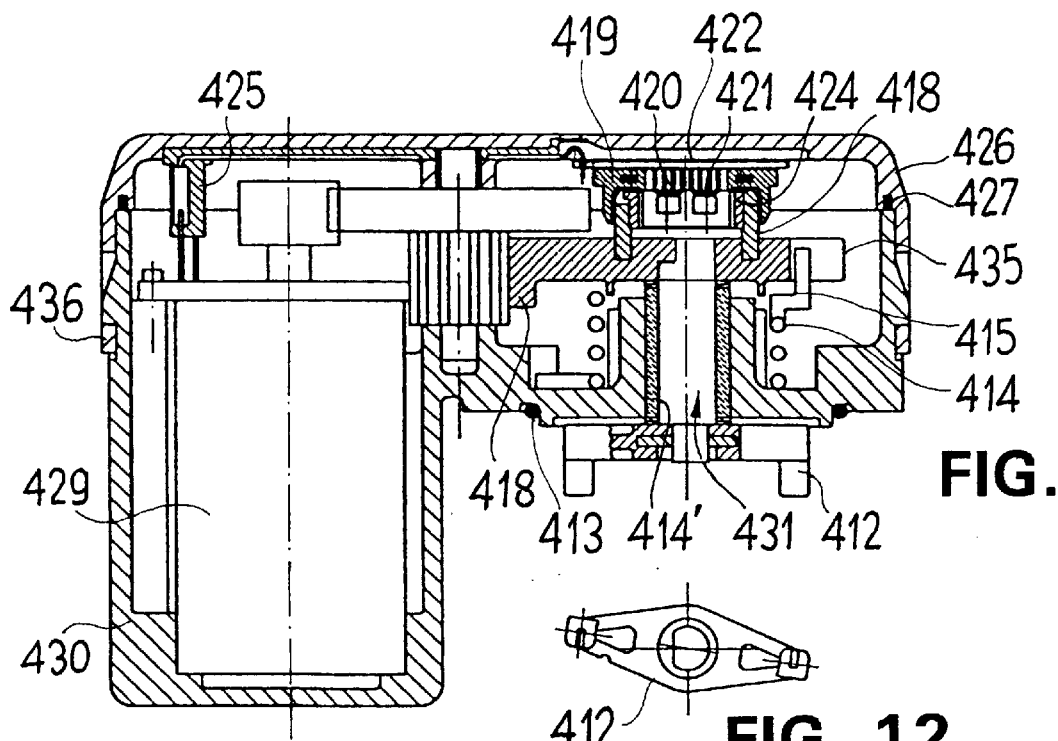
FIG. 11 is another embodiment variant of an angular rotation sensor unit.

As FIGS. 8 and 11 show, the sensor shaft element 331, 431 is retained in a cylindrical bushing of the sensor housing element 330, 430 in a bearing bushing 314', 414' permitting it to rotate. A Teflon disc 316 is positioned over the bearing bushing 314', 414'. Around the cylindrical bushing, a torsion spring 314, 414 is positioned that engages in a stop recess 335, 435 with a stop element 315, 415. This guarantees that the rotor sprocket wheel 341 with the rotor element 317, 417 contained in it returns to a verifiable end position. The motor element 329, 429 is attached with screws 328, 428.

Figure 9:
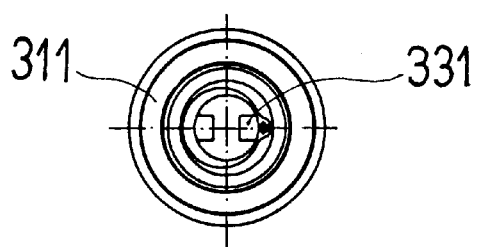
FIG. 9 is a detail Z of an angular rotation sensor unit according to FIG. 2.
Figure 10:
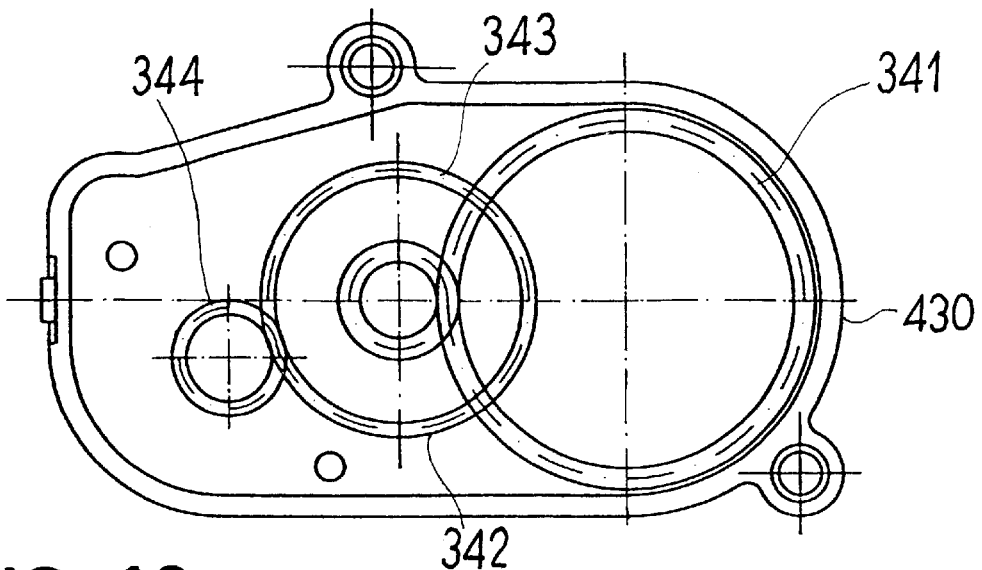
FIG. 10 is a transmission unit for an angular rotation sensor unit.

In FIG. 9 an enlarged view of the retention of the sensor shaft element in the cylindrical bushing is shown as detail Z. For this purpose, a safety ring 311 is provided pressing against a filler plate 312. Additionally, a ring seal 313 is inserted into a groove of the protruding cylindrical bushing.

Figure 12:
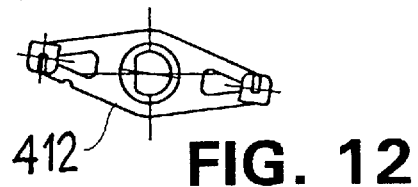
FIG. 12 is a locking element of an angular rotation sensor unit in a schematic bird's eye view according to FIG. 11.

An additional mount of the sensor shaft element 431 is shown in FIGS. 11 and 12. Here, the bearing bushing 440' is retained by a locking element 412, and a ring seal 413 is also inserted into the groove of the cylindrical bushing. The sensor shaft element 431 extends through the locking element as a slot with a one-sided flattened area.

Assembly and function of the adjusting device are explained with special reference to the second embodiment variant that is shown in FIGS. 7 and 10 through 13.

The motor element 429 and the torsion spring 414 are inserted into the sensor housing element. The ring magnet element 424 is pressed into the ring magnet retention element 418 in a parallel position to them. In order to make sure that the ring magnet element 424 is retained in a level position in the ring magnet retention element 418, an assembly jig is provided in the form of a bracket and a correlated recess. The ring-shaped magnet element 424 is configured as a hollow cylinder. This assembled unit is inserted into the rotor sprocket wheel 342 as rotor element 417, and attached to the sensor shaft element 431. Simultaneously, the rotor sprocket wheel 341 is connected to the torsion spring 414, and the stop element 415 is positioned opposite the stop recess 435.

The stator element 419 in the stator retention element 434, and in front of them the circuit board 422 with the two sensor elements 420, 421 attached to it, are positioned inside the housing cap element 426. The circuit board 422 is attached by means of screws. The stator element is also retained and fixed in this manner. The adjustable sprocket wheel and the intermediate sprocket wheel are retained by means of the bolt 425. Then, the cap gasket element 427 is pressed into the recess provided.

The completely equipped sensor cap element 426 is pressed on the completely equipped sensor housing element 430, permitting the intermediate sprocket wheel 342 to be pushed toward rotor sprocket wheel 341 and the motor sprocket wheel 344, thus making the transmission unit functional. Circumferential snap-locks 436 of the cap 426 and the housing 430 make certain that the sensor cap element 426 is connected with the sensor housing element 430. The peripheral cap gasket element 427 guarantees that no dust or similar contaminant can penetrate into the thus created sensor housing unit.

The completed angular rotation sensor unit 400 is plugged onto the end of the throttle valve shaft 305 with its sensor shaft element 431. In this context, it is irrelevant who the manufacturer or supplier of the throttle unit 302 might be. When pressing on the plug-in throttle valve angular rotation sensor, the ring seal 413 is pressed onto the throttle housing element 414, guaranteeing a positive seal between the two housings.

By means of the motor element 429, a torque may be transmitted to the throttle valve shaft element 431, and also accordingly, to the throttle valve shaft 305. In this manner, the throttle valve 306 may be adjusted accordingly within the throttle housing element 304. The angle of the adjustment is registered by the two Hall probes 420, 421 as a rotation of the rotor element in relation to the stator element, and is transmitted as an output signal that is proportional to the angular adjustment. If the motor element 429 no longer receives voltage or in the event that it is interrupted, the torsion spring rotates the rotor sprocket wheel 341, together with the rotor element 417 contained in it, back to the stop element 415. This guarantees that a defined end position is always assumed. This defined end position is not only important for the operation of the plug-in throttle valve angular rotation sensor, but also for its assembly.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having benefit of this description of the invention.

What is claimed is:

1. A position device for a throttle valve, comprising:
    an angular rotation sensor unit and a control unit positioned on a throttle valve shaft element;
    a throttle valve housing element which adjustably positions a throttle valve and said throttle valve shaft elements;
    a cap element which houses the angular rotation sensor unit and at least a portion of the control unit;
    wherein the throttle valve housing element is closed with the cap element, thereby placing a clutch element of the control unit on the throttle valve shaft element;
    wherein the angular rotation sensor unit comprises a stationary unit that is fixed in the cap element and a rotating unit that is retained with a rotor axle at least partially in the stationary unit; and
    wherein the control unit comprises a coupling pin element connected to the rotating unit, and wherein the clutch element is positioned on the coupling pin element.

2. The position device according to claim 1, wherein the angular rotation sensor unit comprises a resistive angular rotation sensing unit or a magnetoelectric angular rotation sensing unit.

3. The position device according to claim 1, wherein the control unit comprises a first position unit.

4. The position device according to claim 3, wherein the first position unit is arranged outside of the cap element.

5. The position device according to claim 3, wherein the control unit comprises a transmission that is positioned in the cap element between the rotating unit and a second position unit.

6. The position device according to claim 5, wherein the coupling pin element is a toothed gear element carrying at least one coupling pin insertable into at least one rotor coupling pin recess of the rotating unit.

7. The position device according to claim 6, wherein the toothed gear element is part of the transmission.

8. The position device according to claim 5, wherein the transmission comprises a gear ratio of 1:200.

9. The position device according to claim 5, wherein the transmission is selected from the group consisting of a standard transmission and a planetary gear transmission.

10. The position device according claim 6, wherein the transmission comprises:

the toothed gear element;

a motor bevel gear connected to the second position unit;

an intermediate bevel gear; and an adjusting bevel gear arranged on the intermediate bevel gear, said adjusting bevel gear being supported rotatably in the cap element, wherein the toothed gear element engages the adjusting bevel gear and the motor bevel gear engages the intermediate bevel gear.

11. The position device according to claim 3, wherein the stationary unit is a stator element that comprises plural partial stator elements separated by a distancing gap, within which at least one Hall-effect IC element is positioned.

12. The position device according to claim 11, further comprising plural Hall-effect IC elements within the plural partial stator elements.

13. The position device according to claim 12, wherein the plural Hall-effect IC elements are attached to a circuit board in the cap element positioned in the distancing gap between the partial stator elements.

14. The position device according to claim 13, wherein the plural Hall-effect IC elements are connected to an evaluation unit that is positioned on the circuit board.

15. The position device according to claim 3, wherein the rotating unit is a rotor element comprising a ring retention element, held with a ring magnet element, and movable while maintaining an air gap with a stator element.

16. The position device according to claim 1, wherein the cap element is surrounded at least partially by a cap locking ring.

17. The position device according to claim 16, further comprising a snap-lock ring element on the throttle valve housing element, said snap-lock ring element at least in part snap locks with the cap locking ring.

18. The position device according to claim 1, wherein the cap element is molded out of plastic material or metal.

* * * * *